(12) United States Patent
Mireault et al.

(10) Patent No.: US 11,726,343 B2
(45) Date of Patent: Aug. 15, 2023

(54) FOLDED OPTICS CAMERA ACTUATOR AND SUSPENSION ARRANGEMENT

(71) Applicant: Apple Inc., Cupertino, CA (US)

(72) Inventors: Alfred N. Mireault, San Francisco, CA (US); Jason T. Weaver, Cupertino, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/481,224

(22) Filed: Sep. 21, 2021

(65) Prior Publication Data

US 2022/0091482 A1 Mar. 24, 2022

Related U.S. Application Data

(60) Provisional application No. 63/083,018, filed on Sep. 24, 2020.

(51) Int. Cl.
| | |
|---|---|
| *G02B 27/64* | (2006.01) |
| *G03B 5/02* | (2021.01) |
| *G03B 30/00* | (2021.01) |
| *H04N 23/68* | (2023.01) |
| *G03B 17/17* | (2021.01) |
| *G03B 17/12* | (2021.01) |

(Continued)

(52) U.S. Cl.
CPC .......... *G02B 27/646* (2013.01); *G03B 5/02* (2013.01); *G03B 13/36* (2013.01); *G03B 17/12* (2013.01); *G03B 17/17* (2013.01); *G03B 30/00* (2021.01); *H04N 23/687* (2023.01); *G03B 2205/0007* (2013.01); *G03B 2205/0069* (2013.01); *H02K 41/0354* (2013.01)

(58) Field of Classification Search
CPC ............ G02B 7/02–105; G02B 27/646; G02B 13/0065–007
See application file for complete search history.

(56) References Cited

U.S. PATENT DOCUMENTS

| 9,927,600 B2 * | 3/2018 | Goldenberg ......... H04N 5/2257 |
| 2018/0196238 A1 | 7/2018 | Goldenberg et al. |

(Continued)

FOREIGN PATENT DOCUMENTS

| CN | 111308642 A * | 6/2020 | |
| WO | WO-2020082425 A1 * | 4/2020 | ........... G02B 27/646 |

OTHER PUBLICATIONS

International Search Report and Written Opinion dated Dec. 10, 2021 in International Application No. PCT/US2021/051603, Apple Inc., pp. 1-11.

*Primary Examiner* — Leon W Rhodes, Jr.
(74) *Attorney, Agent, or Firm* — Robert C. Kowert; Kowert, Hood, Munyon, Rankin & Goetzel, P.C.

(57) ABSTRACT

Various embodiments include a folded optics camera actuator and suspension arrangement. For example, the folded optics camera may include one or more voice coil motor (VCM) actuators for moving a lens group, relative to an image sensor, in multiple directions. The folded optics camera may include a suspension arrangement that suspends a lens barrel arrangement from a base structure of the camera, and that allows motion of the lens group enabled by the VCM actuator(s). In some embodiments, the folded optics camera may include an actuator for moving a light folding element relative to the image sensor.

20 Claims, 9 Drawing Sheets

(51) Int. Cl.
*G03B 13/36* (2021.01)
*H02K 41/035* (2006.01)

(56) References Cited

U.S. PATENT DOCUMENTS

| | | |
|---|---|---|
| 2019/0212632 A1 | 7/2019 | Miller et al. |
| 2019/0381952 A1 | 12/2019 | Wang |
| 2020/0225442 A1* | 7/2020 | Weng .................. G03B 11/045 |

* cited by examiner though the terms first,
FOLDED OPTICS CAMERA ACTUATOR AND SUSPENSION ARRANGEMENT This application claims benefit of priority to U.S. Provisional Application Ser. No. 63/083,018, entitled "Folded Optics Camera Actuator and Suspension Arrangement," filed Sep. 24, 2020, and which is hereby incorporated herein by reference in its entirety.

BACKGROUND

Technical Field

This disclosure relates generally to architecture for a folded optics camera actuator and suspension arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 2A shows an exploded perspective view of the folded optics camera. FIG. 2B shows a schematic side cross-sectional view of the folded optics camera.

FIG. 3A shows a magnet-coil arrangement of the VCM actuator(s). FIG. 3B shows an example of X-translation motion (e.g., autofocus (AF) motion). FIG. 3C shows an example of Y-translation motion (e.g., optical image stabilization (OIS) motion). FIG. 3D shows an example of Z-tilt motion, which may be used, for example, to compensate for undesirable Z-tilt motion so as to maintain appropriate optical alignment of the lens group in some embodiments.

Figure 1:
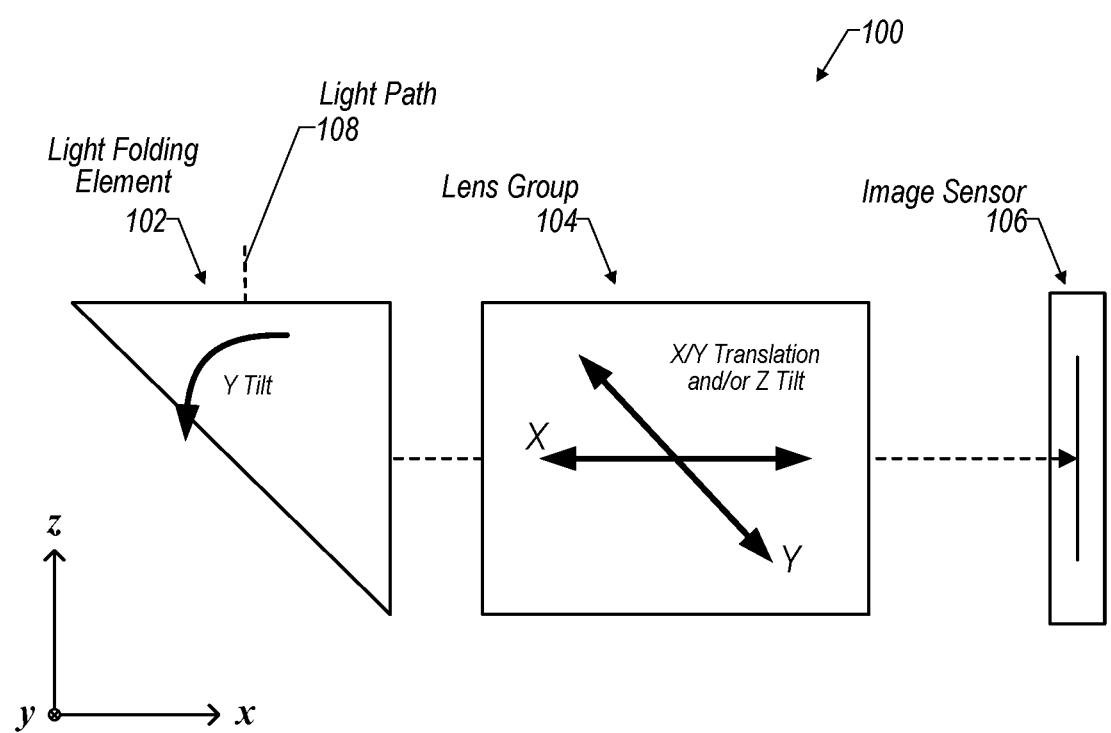
FIG. 1 illustrates a schematic side view of an example folded optics system that may include one or more actuators and one or more suspension arrangements, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a folded optics camera actuator and suspension arrangement. In some embodiments, a camera having a folded optics arrangement may include a light folding element (e.g., a prism, a mirror, etc.), a lens group, and an image sensor. The camera may include an actuator arrangement that includes one or more actuators for moving the light folding element relative to the image sensor, and/or one or more voice coil motor (VCM) actuators for moving the lens group relative to the image sensor.

In some embodiments, the VCM actuator(s) for moving the lens group may be configured to translate the lens group in at least a first direction (e.g., an X-axis direction) parallel to an optical axis defined by the lens group, translate the lens group in at least a second direction (e.g., a Y-axis direction) orthogonal to the optical axis, and/or tilt the lens group about an axis that extends in a third direction (e.g., a Z-axis direction) orthogonal to the first direction and the second direction. According to various embodiments, the VCM actuator(s) may include movable magnets that are attached to a lens barrel arrangement, and stationary coils that are attached to a flex circuit and/or to a base structure of the camera. Furthermore, the actuator(s) for moving the light folding element may be configured to tilt the light folding element about an axis that extends in the second direction (e.g., the Y-axis direction) in some embodiments.

In some embodiments, the camera may include a suspension arrangement that suspends the lens barrel arrangement from the base structure, and that allows motion of the lens group enabled by the VCM actuator(s). For example, the suspension arrangement may include one or more springs attached to the lens barrel arrangement, and suspension wires attached to the spring(s) and to the base structure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a schematic side view of an example folded optics system 100 (e.g., a folded optics camera) that may include one or more actuators and/or one or more suspension arrangements. The example X-Y-Z coordinate system shown in FIG. 1 may apply to embodiments discussed throughout this disclosure.

According to various embodiments, the folded optics system 100 may include one or more light folding elements (e.g., light folding element 102), a lens group 104, and an image sensor 106. The light folding element 102 may be an optical element that is capable of folding a path of light. In some examples, the light folding element 102 may comprise a prism, a mirror, and/or the like. The lens group 104 may include one or more lens elements (e.g., lens element(s) 210 in FIG. 2A). The image sensor 106 may be configured to generate image data based on light captured by the image sensor 106. For example, the image sensor 106 may generate image data based on light that has passed through at least a portion of the folded optics arrangement formed by the light folding element 102 and the lens group 104. The folded optics system 100 is intended to provide an example of a system having a folded optics arrangement; various embodiments, however, may include one or more differences (e.g., with respect to number of optical elements, type(s) of optical elements, and/or positioning of components, etc.) relative to the configuration of the folded optics system 100 shown in FIG. 1.

In some embodiments, the lens group 104 may be located between the light folding element 102 and the image sensor 106. The light folding element 102 and the lens group 104 may form a folded optics arrangement (e.g., a single fold optics arrangement as indicated in FIG. 1) through which light passes before reaching the image sensor 106. Light may follow a light path 108 that is folded by the light folding element 102 such that the light is directed towards the lens group 102, passes through the lens group 102, and then reaches the image sensor 106. In some examples, light may enter an object side of the light folding element 102 in a direction parallel to the Z-axis. The light folding element 102 may redirect the light to propagate in the X-axis direction (which may be parallel to an optical axis defined by the lens group 104), e.g., such that the light exits a lens group-facing side of the light folding element 102, towards the lens group 104. The light may pass through the lens group 104 and continue propagating in the X-axis direction towards the image sensor 106 (which may be vertically oriented, e.g., such that the image sensor 106 defines a plane that is orthogonal to the X-axis and/or the optical axis defined by the lens group 104). The light folding element 102, the lens group 104, and/or the image sensor 106 may be positioned along a common axis (e.g., the X-axis, the optical axis defined by the lens group 104, etc.). According to some examples, the light path 108 may be contained within a plane (e.g., parallel to the X-Z plane), and the image sensor 106 may extend along a different plane (e.g., parallel to the Y-Z plane).

In some embodiments, the object side of the light folding element 102 may extend along the X-Y plane. Furthermore, the light folding element 102 may include a pair of opposing lateral sides that each extend along the X-Z plane, a lens group facing side that extends along the Y-Z plane, and a reflecting surface side that is angled relative to one or more of the other sides of the light folding element. For example, the reflecting surface side of the light folding element 102 may include a reflective surface that is angled so as to redirect light received from the object side of the light folding element towards the lens group 104 (via the lens group-facing side of the light folding element 102) and the image sensor 106, as discussed above.

While a prism may be shown in various figures as an example of a light folding element, the camera systems and/or folded optics arrangements described herein may include any suitable light folding element (e.g., a mirror or the like) or combination of elements. In some embodiments, a light folding element may also act as a lens element (or combination of lens elements). For example, one or more lens elements (e.g., other than those of the lens group 104) may be integrated with the light folding element 102 (and/or another light folding element) such that the light folding element acts as a lens element. Additionally, or alternatively, the light folding element 102 may be shaped such that the light folding element acts as a lens element.

In various embodiments, the light folding element 102 and/or the lens group 104 may be coupled with one or more actuators (e.g., as discussed herein with reference to at FIGS. 2A-3D) configured to move the light folding element 102 and/or the lens group 104 to provide optical image stabilization (OIS) and/or autofocus (AF) functionality. For example, the light folding element 102 may be coupled with actuator(s) configured to tilt or otherwise move the light folding element 102. As indicated in FIG. 1, in various embodiments the actuator(s) may be configured to tilt the light folding element about the Y-axis, e.g., to provide OIS-Z motion (e.g., motion that shifts the image projected onto the image sensor 106 in the Z-axis direction). Additionally, or alternatively, the actuator(s) may be configured to translate or otherwise move the lens group 104. For example, the actuator(s) may be configured to translate the lens group 104 in the X-axis (e.g., to provide AF motion) and/or Y-axis directions (e.g., to provide OIS-Y motion that shifts the image projected onto the image sensor 106 in the Y-axis direction). In some embodiments, actuator(s) may be configured to tilt the lens group 104 about the Z axis, e.g., to compensate for undesirable Z-tilt motion so as to maintain appropriate optical alignment of the lens group 104.

In some embodiments, the actuator(s) (and/or other actuator(s) of the folded optics system 100) may comprise one or more voice coil motor (VCM) actuators, e.g., as described herein with reference to FIGS. 2A-3D. However, the folded optics system 100 may additionally, or alternatively, include one or more other types of actuators (e.g., a piezoelectric actuator, a comb drive actuator, etc.) in some embodiments.

Figure 2A:
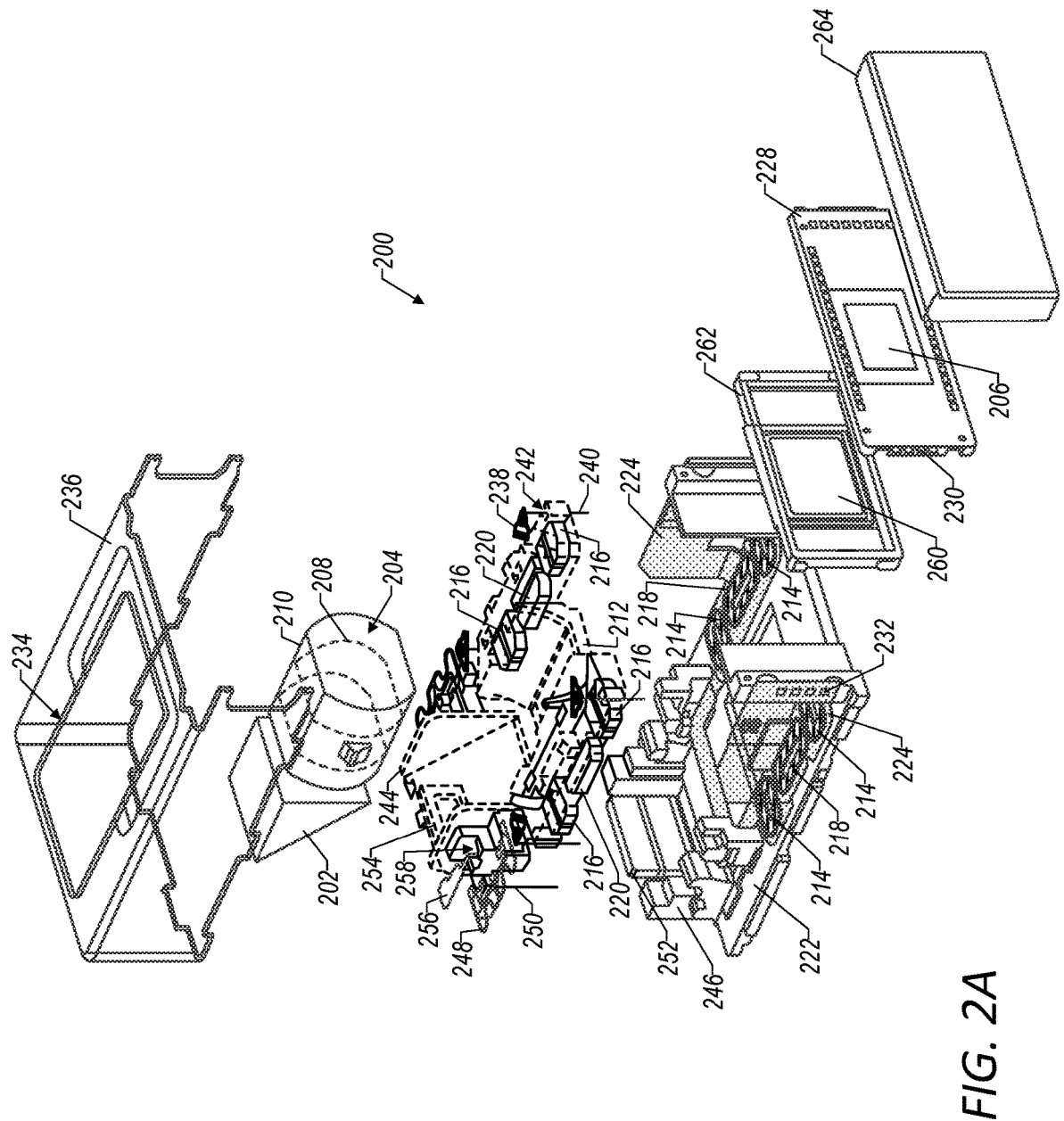
FIGS. 2A-2B illustrate views of an example folded optics camera that may include one or more actuators and one or more suspension arrangements, in accordance with some embodiments.
Figure 2B:
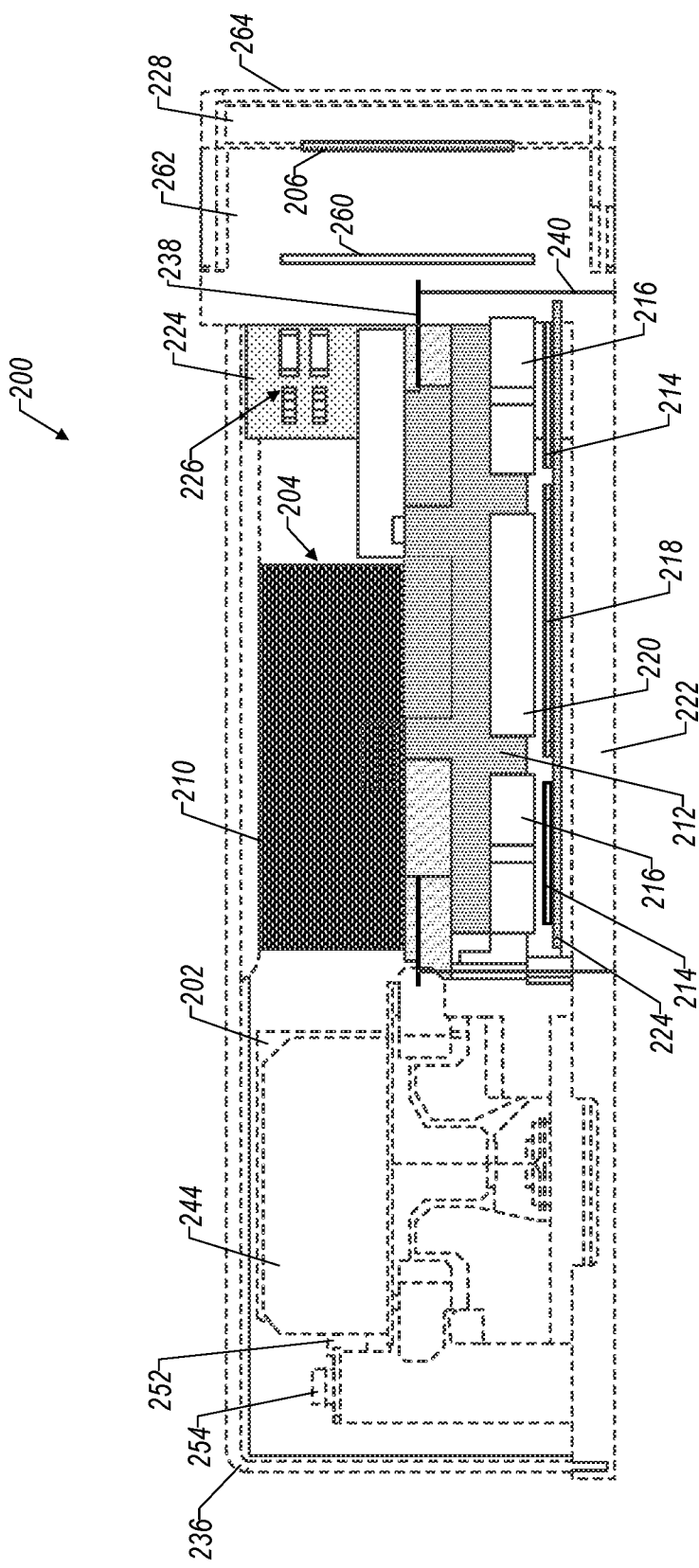

As discussed herein with reference to FIGS. 2A-2B, the folded optics system 100 may include one or more suspension arrangements. For example, the folded optics system 100 may include a suspension arrangement for suspending the light folding element 102 from one or more stationary structures. Furthermore, the folded optics system 100 may include suspension arrangement for suspending the lens group 104 from one or more stationary structures (e.g., base structure 220 in FIGS. 2A-2B).

FIGS. 2A-2B illustrate views of an example folded optics camera 200 that may include one or more actuators and one or more suspension arrangements, in accordance with some embodiments. FIG. 2A shows an exploded perspective view of the camera 200. FIG. 2B shows a schematic side cross-sectional view of the camera 200.

In some embodiments, the camera 200 may include a light folding element 202 (e.g., light folding element 102 in FIG. 1), a lens group 204 (e.g., lens group 104 in FIG. 1), and an image sensor 206 (e.g., image sensor 106 in FIG. 1). The lens group may include one or more lens elements 208 that are fixedly coupled with a lens barrel arrangement that may include a lens barrel 210 and/or a lens carrier 212. In some embodiments, the lens element 208 may be contained within the lens barrel arrangement. Lens barrel arrangements that may be used in some embodiments are also discussed herein with reference to FIGS. 4 and 5.

According to various embodiments, the camera 200 may include one or more voice coil motor (VCM) actuators for moving the lens group 204. For example, the VCM actuator(s) may include one or more autofocus (AF) coils 214, one or more AF magnets 216, one or more optical image stabilization (OIS) coils (e.g., OIS-Y coil(s) 218), and one or more OIS magnets (e.g., OIS-Y magnet(s) 220). In various examples, the AF coil(s) 214 and the OIS-Y coil(s) 218 may be fixedly coupled with a base structure 222. In various embodiments, the base structure 222 may be stationary relative to motion of the lens group 204. The AF magnet(s) 216 and the OIS-Y magnet(s) 220 may be fixedly coupled with the lens barrel arrangement (e.g., with the lens carrier 212, as indicated in FIGS. 2A-2B). The AF coil(s) 214 may electromagnetically interact with the AF magnet(s) 216 (e.g., when electrical current is supplied to the AF coil(s) 214) to produce Lorentz forces that move the lens barrel arrangement and the lens group 204 in one or more directions parallel to an optical axis defined by the lens group 204 (e.g., in the X-axis direction to provide AF motion). The OIS-Y coil(s) 218 may electromagnetically interact with the OIS-Y magnet(s) 220 (e.g., when electrical current is supplied to the OIS-Y coil(s) 218) to produce Lorentz forces that move the lens barrel arrangement and the lens group 204 in one or more directions to the optical axis (e.g., in the Y-axis direction to provide OIS-Y motion). In some embodiments, the VCM actuator(s) may be configured to move the lens group 204 in multiple directions along a plane (e.g., the X-Y plane) that is orthogonal to an image plane (which may be parallel to the Y-Z plane) of the image sensor 206. The VCM actuator(s) that move the lens group 204 are discussed in further detail herein with reference to FIGS. 3A-3D.

In some embodiments, the camera 200 may include a flex circuit 224 that is fixedly coupled with the base structure 222 and/or the coils (AF coil(s) 214 and OIS-Y coil(s) 218). According to some embodiments, the camera 200 may be configured to convey electrical current to the coils via the flex circuit 224. For example, as indicated in FIG. 2B, one or more electrical components 226 may be mounted on the flex circuit 224. In some embodiments, the electrical components 226 may include, for example, a driver integrated circuit used for driving the coils. It should be appreciated, however, that one or more driver integrated circuits may be located elsewhere, e.g., on the substrate 228 to which the image sensor 206 is fixedly coupled. The substrate 228 may include electrical connections (e.g., contact pads 230) that may be used to electrically couple the image sensor 206 and/or the substrate 228 with the flex circuit 224 (e.g., via corresponding electrical connections on the flex circuit 224, such as contact pads 232).

In some embodiments, the respective coils (AF coil(s) 214 and OIS-Y coil(s) 218) may be positioned, in the Z-axis direction, between respective magnets (AF magnet(s) 216 and OIS-Y magnet(s) 220) and the base structure 222. According to various embodiments, light may be introduced into the camera 200 via a top of the camera 200 (e.g., via an opening 234 (or window area) defined by a shield can 236 that at least partially encases the camera 200, and the coils may be positioned proximate a bottom of the camera 200. The magnets may be attached to the lens barrel arrangement such that they are set low, close to the bottom of the camera 200. For example, the magnets may extend, in the Z-axis direction, below a center of mass of the lens group 204.

According to various embodiments, the camera 200 may include a suspension arrangement that suspends the lens barrel arrangement from the base structure 222 and that allows motion of the lens group 204 enabled by the VCM actuator(s). For example, the suspension arrangement may include one or more springs 238 (e.g., sheet springs) and suspension wires 240. The spring(s) 238 may be attached to the lens barrel arrangement and the suspension wires 240 may be attached to the spring(s) 238 and to the base structure 222 in some embodiments, e.g., as indicated in FIGS. 2A-3D. In some embodiments, the spring(s) 238 comprise sheet springs that are attached to corner portions of the lens barrel arrangement (e.g., corner portions of the lens carrier 212), and respective suspension wires 240 may be attached to respective sheet springs. In some embodiments, the sheet springs may define a plane that is parallel to the optical axis (e.g., the X-Y plane), and the respective suspension wires 240 may define respective axes that are orthogonal to the plane (defined by the sheet springs) and orthogonal to the optical axis. The lens barrel arrangement may define pockets 242 (and/or cavities/recesses, or the like) that at least partially encircle the suspension wires 240 in some embodiments. The pockets 242 may contain a viscoelastic material. A portion of the suspension wires 240 may be disposed within the viscoelastic material, so as to interface with the viscoelastic material to dampen motion.

In some embodiments, the camera 200 may include one or more actuators to move the light folding element 202 relative to the image sensor. For example, the actuator(s) may be configured to tilt the light folding element about one or more axes to provide OIS functionality. According to various embodiments, the actuator(s) may include a tilt actuator for tilting the light folding element 202 about the Y-axis to provide OIS-Z motion (e.g., motion that shifts the image projected onto the image sensor 206 in the Z-axis). In some embodiments, the actuator(s) for moving the light folding element 202 may comprise one or more VCM actuators; however, the actuator(s) may include one or more other types of actuators (e.g., a piezoelectric motor, a comb drive actuator, etc.) in some embodiments.

In some embodiments, a light folding element carrier 244 may be fixedly coupled with the light folding element 202, such that the carrier 244 is movable (e.g., via the actuator(s)) together with the light folding element 202, relative to a stationary structure 246 (which may be part of the base structure 222 or may be another base structure component that is attached to the base structure 222). A suspension arrangement may be used to suspend the carrier 244 from the stationary structure 246 and to allow motion of the light folding element 202 enabled by the actuator(s). In some embodiments, the suspension arrangement may include one or more springs (e.g., sheet spring(s) 248 and/or one or more wires (e.g., suspension wire(s) 250).

In some embodiments, the actuator(s) for moving the light folding element 202 may include one or more magnets (e.g., magnet 252) and one or more coils (e.g., coil 254) that electromagnetically interact with one another to produce Lorentz forces that move the carrier 244 together (e.g., in lockstep) with the light folding element 202 relative to the stationary structure 246. In some embodiments, the flex circuit 224 (and/or another flex circuit) may be used to convey electrical current to the coil 254, e.g., via the suspension wire(s) 250 and sheet spring(s) 248.

According to some embodiments, the camera 200 may include one or more damping pins 256 that may be configured to dampen motion of the carrier 244, e.g., during actuation. In some embodiments, a first portion of a respective damping pin 256 may be attached to the stationary structure 246. The damping pin 256 may extend towards a pocket 258 (and/or a cavity, a recess, or the like) within which a viscoelastic material is contained. The pocket 258 may be defined by a portion of the carrier 244. In some embodiments, a second portion of the damping pin 256 may be disposed within the viscoelastic material contained in the pocket 258, so as to interface with the viscoelastic material to dampen motion.

In some embodiments, the camera 200 may include an optical filter 260 (e.g., an infrared cut-off filter (IRCF)) that is fixedly coupled with a filter substrate 262. The optical filter 260 may be positioned, in the X-axis direction, between the lens group 204 and the image sensor 206, e.g., such that light that passes through the lens group 204 then passes through the optical filter 260 before reaching the image sensor 206. Furthermore, the camera 200 may include a stiffener 264 in some embodiments. The stiffener 264 may at least partially encase the camera 200. For example, the stiffener 264 may at least partially encase the substrate 228 for the image sensor 206 and the filter substrate 262.

Figure 3A:
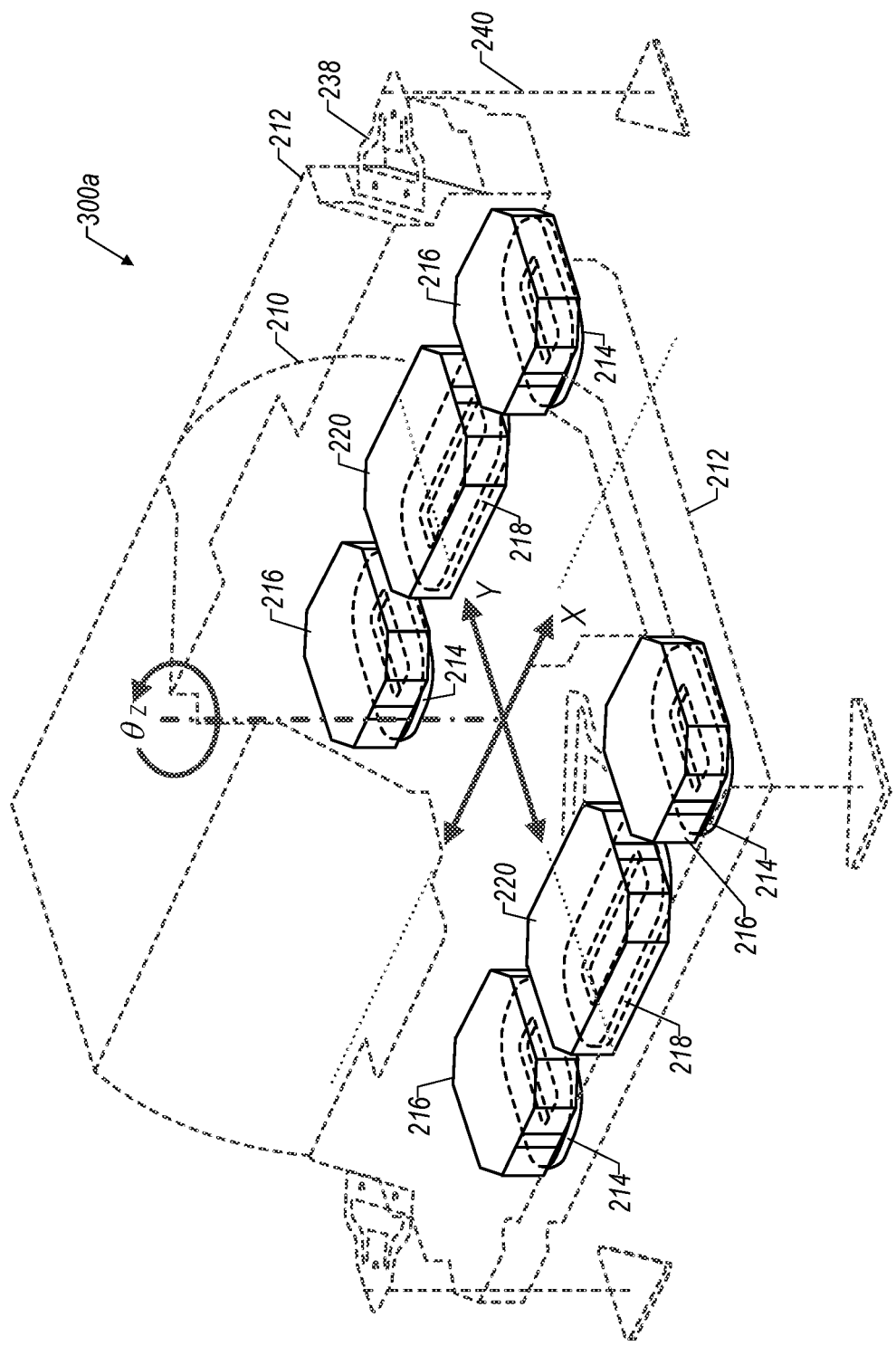
FIGS. 3A-3D illustrate example lens motion that may be implemented using one or more voice coil motor (VCM) actuators that may be included in a folded optics camera, in accordance with some embodiments.
Figure 3B:
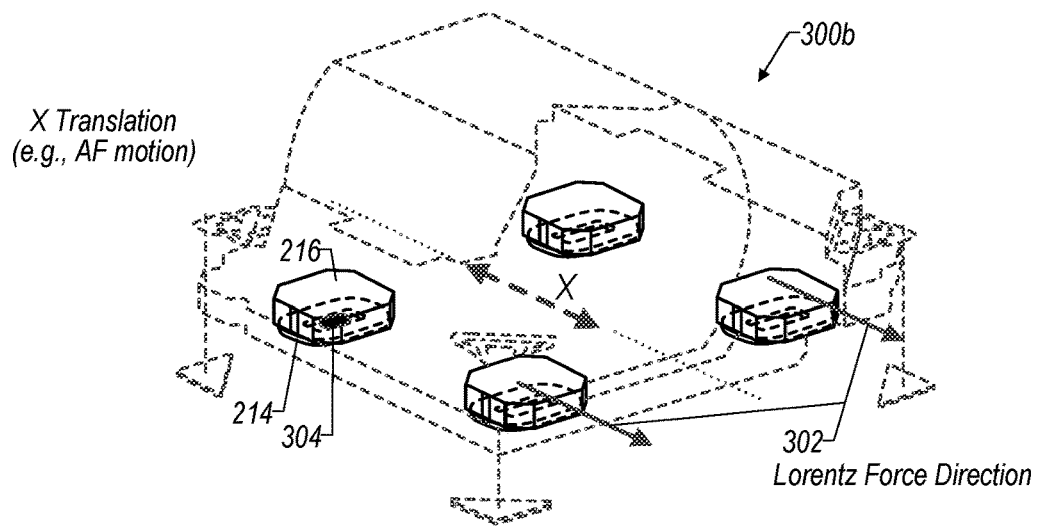
Figure 3C:
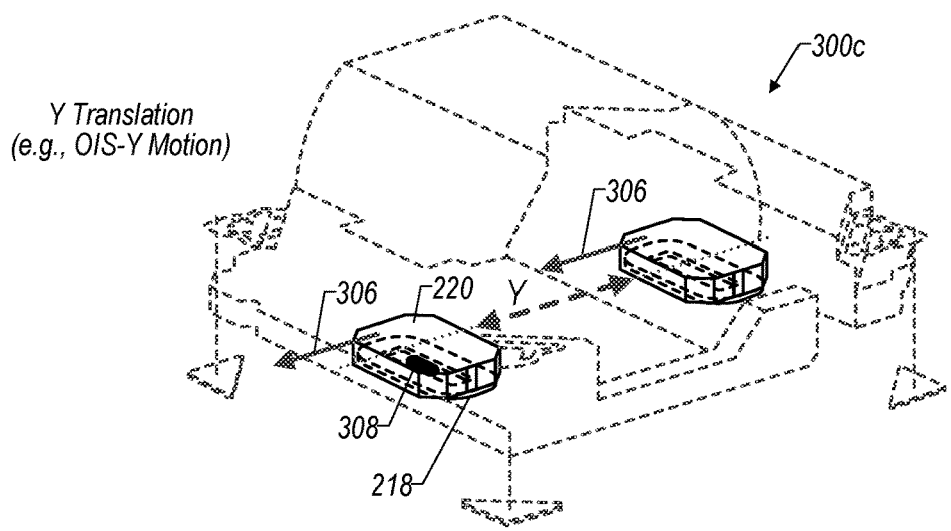
Figure 3D:
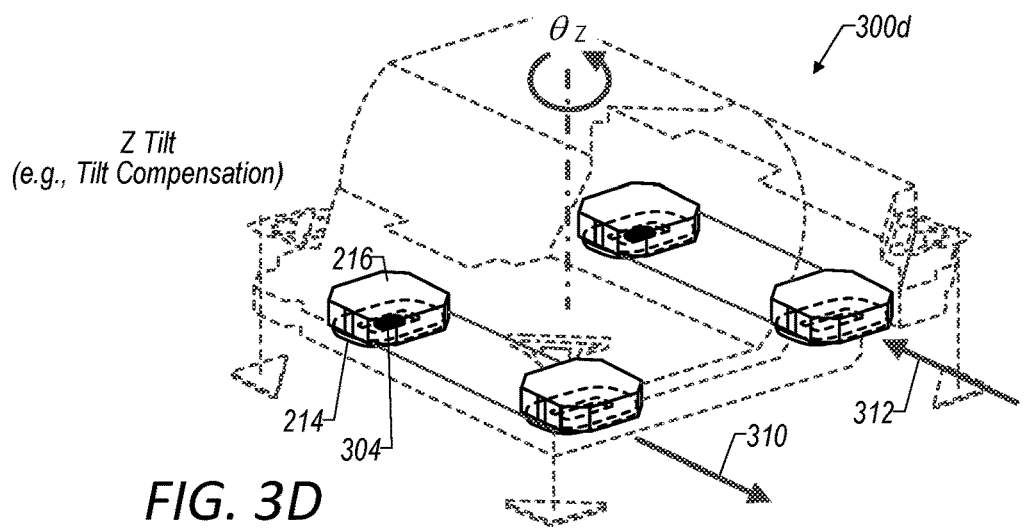

FIGS. 3A-3D illustrate example lens motion that may be implemented using one or more voice coil motor (VCM) actuators that may be included in a folded optics camera (e.g., folded optics system 100 and folded optics camera 200 in FIGS. 1-2B). FIG. 3A shows an example magnet-coil arrangement 300*a* of the VCM actuator(s). FIG. 3B shows an example 300*b* of X-translation motion (e.g., autofocus (AF) motion). FIG. 3C shows an example 300*c* of Y-translation motion (e.g., optical image stabilization (OIS) motion). FIG. 3D shows an example 300*d* of Z-tilt motion, which may be used, for example, to compensate for undesirable Z-tilt motion so as to maintain appropriate optical alignment of the lens group in some embodiments.

As indicated in FIG. 3A, the magnet-coil arrangement 300*a* may include a first set of magnets, a second set of magnets, a first set of coils, and a second set of coils. The first set of magnets may be positioned, in the Y-axis direction, between the lens group (e.g., contained within lens barrel 210) and a first side of the camera (which may be defined, for example, by a first side of the shield can 236 that extends orthogonal to the top portion of the shield can 236). The second set of magnets may be positioned, in the Y-axis direction, between the lens group and a second side of the camera that is opposite the first side (relative to the lens group). The first set of coils may be positioned, in the Y-axis direction, between the lens group and the first side of the camera. The second set of coils may be positioned, in the Y-axis direction, between the lens group and the second side of the camera.

According to some embodiments, each of the first set of magnets and the second set of magnets may include a respective first AF magnet 216, a respective second AF magnet 216, and a respective OIS magnet 220. The respective OIS magnet 220 may be positioned, in the X-axis direction, between the respective first AF magnet 216 and the respective second AF magnet 216. The respective first and second AF magnets 216 may have a respective longest dimension in the Y-axis direction in some embodiments. The respective OIS magnet 220 may have a longest dimension in the X-axis direction in some embodiments.

According to some embodiments, each of the first set of coils and the second set of coils may include a respective first AF coil 214, a respective second AF coil 214, and a respective OIS coil 218. The respective OIS coil 218 may be positioned, in the X-axis direction, between the respective first AF coil 214 and the respective second AF coil 214. The respective first and second AF coils 214 may have a respective longest dimension in the Y-axis direction in some embodiments. The respective OIS coil 218 may have a longest dimension in the X-axis direction in some embodiments.

In various embodiments, the magnet-coil arrangement 300a may be configured to provide motion in multiple degrees of freedom, such as X-translation motion (as indicated by arrows X), Y-translation motion (as indicated by arrows Y), and/or Z-tilt motion (as indicated by arrow θz).

As indicated in the example 300b of X-translation motion in FIG. 3B, the respective first AF magnet 216 and the respective first AF coil 214 are capable of electromagnetically interacting with one another to produce Lorentz forces that move the lens group (e.g., in Lorentz force direction 302) so as to provide AF motion of an image on the image sensor (e.g., image sensor 106 and/or image sensor 206 in FIGS. 1-2B). Similarly, the respective second AF magnet 216 and the respective second AF coil 214 are capable of electromagnetically interacting with one another to produce Lorentz forces that move the lens group (e.g., in Lorentz force direction 302) so as to provide AF motion of the image on the image sensor. In this example 300b, the VCM actuator(s) are controlled such that the Lorentz forces from these electromagnetic interactions are in the same direction, e.g., towards the image sensor or away from the image sensor. In various embodiments, one or more position sensors (e.g., position sensor 304) may be used to determine a position of the lens group in the X-axis direction, e.g., based on changes in magnetic field(s) that the position sensor(s) are capable of detecting. In some embodiments, the position sensor 304 may be fixedly coupled with a flex circuit (e.g., flex circuit 224 in FIGS. 2A-2B). Furthermore, the position sensor 304 may be positioned within a respective inner periphery of one or more of the AF coils 214.

As indicated in the example 300c of Y-translation motion in FIG. 3C, the respective OIS magnet 220 and the respective OIS coil 218 are capable of electromagnetically interacting with one another to produce Lorentz forces that move the lens group (e.g., in Lorentz force direction 306) so as to provide OIS motion (e.g., OIS-Y motion) of the image on the image sensor. In this example 300b, the VCM actuator(s) are controlled such that the Lorentz forces from these electromagnetic interactions are in the same direction. In various embodiments, one or more position sensors (e.g., position sensor 308) may be used to determine a position of the lens group in the Y-axis direction, e.g., based on changes in magnetic field(s) that the position sensor(s) are capable of detecting. In some embodiments, the position sensor 308 may be fixedly coupled with a flex circuit (e.g., flex circuit 224 in FIGS. 2A-2B). Furthermore, the position sensor 308 may be positioned within a respective inner periphery of one or more of the OIS coils 218. In some embodiments, position sensor 308 may have a different orientation relative to position sensor 304.

As indicated in the example 300d of Z-tilt motion in FIG. 3D, the VCM actuator(s) may be controlled to produce, using the AF magnets 216 and coils 214, Lorentz forces that tilt the lens group about the Z-axis, e.g., so as to compensate for forces that would cause the lens group to stray from a predetermined optical alignment. For example, this may be achieved by controlling electrical current supplied to the respective first AF coil 214 and the respective second AF coil 214 of the first set of coils (e.g., to produce Lorentz forces in direction 310) independently of electrical current supplied to the respective first AF coil 214 and the respective second AF coil 214 of the second set of coils (e.g., to produce Lorentz forces in direction 312). In this manner, Lorentz forces produced by the AF portion of the first set of coils/magnets may be in an opposite direction from the Lorentz forces produced by the AF portion of the second set of coils/magnets, thereby causing the lens group to tilt (or rotate) about the Z-axis. In example 300d, the position sensor(s) include at least one position sensor 304 for the first set of coils and at least one position sensor 304 for the second set of coils, which allows for differential position sensing at opposite sides of the lens group, thus enabling Z-tilt control for compensation purposes.

Figure 4:
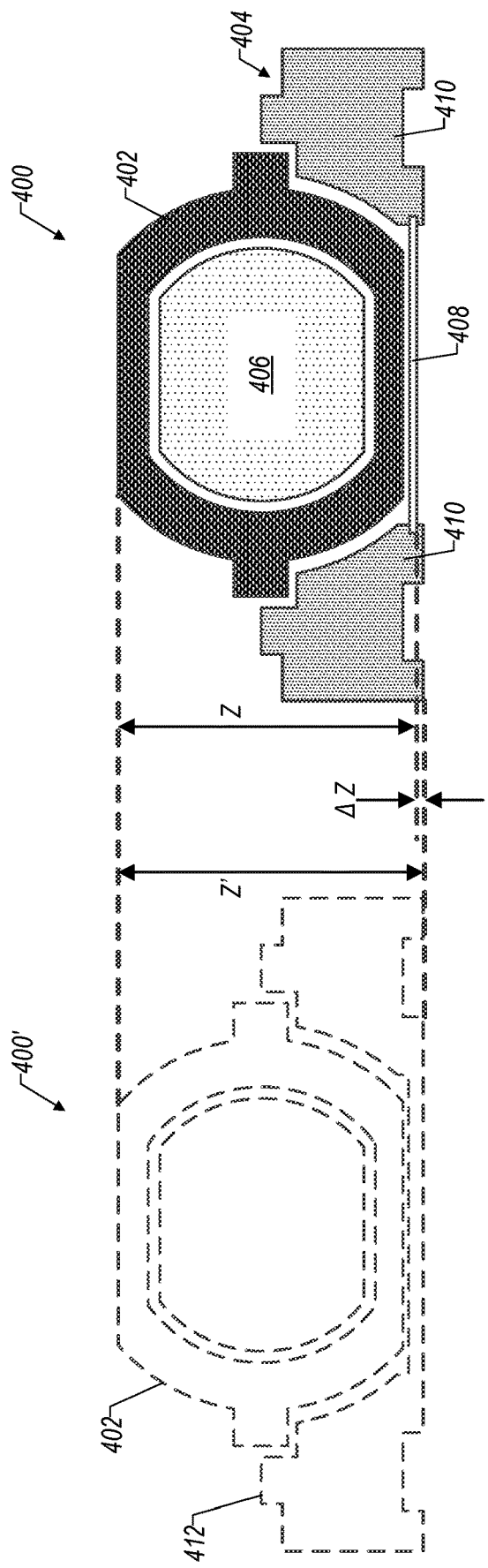
FIG. 4 illustrates an example lens barrel arrangement that may enable a size reduction (e.g., in the Z-axis direction) of a lens module that may be included in a folded optics camera, in accordance with some embodiments.

FIG. 4 illustrates an example lens barrel arrangement 400 that may enable a size reduction (e.g., in the Z-axis direction) of a lens module that may be included in a folded optics camera (e.g., folded optics system 100 and/or folded optics camera 200 in FIGS. 1-2B). In various embodiments, the lens barrel arrangement 400 may include a lens barrel 402 and a lens carrier 404. In some embodiments, a lens group 406 may be fixed coupled with the lens barrel 402. For example, the lens group 406 may be at least partially contained within the lens barrel 402. The lens carrier 404 may be fixedly coupled with the lens barrel 402, e.g., such that the lens barrel 402 and the lens group 406 are movable together with the lens carrier 404. As indicated in FIG. 4, the lens carrier 404 may at least partially encase a lower portion of the lens barrel 402 in some embodiments. The lens carrier 404 may be formed via injection molding. In some embodiments, the lens carrier 404 may include an insert-molded metal element 408 that forms a floor of the lens carrier 404 and that is positioned proximate a bottom surface of the lens barrel 402. The insert-molded metal element 408 may be integrated with side portions 410 formed of plastic in the injection molding process. The insert-molded metal element may have a first end partially embedded within a first side portion 410, and a second end partially embedded within a second side portion that is opposite the first side portion relative to the lens group 406.

In some embodiments, the lens barrel arrangement 400 may enable a size reduction (e.g., in the Z-axis direction) compared to some other arrangements. For example, arrangement 400' includes the lens barrel 402 and a different lens carrier 412 that does not have an insert-molded metal element; rather, the floor of the lens carrier 412 is the same as the sides of the lens carrier 412, which may be formed of plastic via injection molding. The lens barrel arrangement 400 may have a Z dimension (in the Z-axis direction) that is a distance from a bottom surface of the insert-molded metal element 408 to a top surface of the lens barrel 402. By contrast, the arrangement 400' may have a Z' dimension (in the Z-axis direction) that is a distance from a bottom surface of the lens carrier 412 to a top surface of the lens barrel 402. The Z dimension of the lens barrel arrangement 400 may be smaller than the Z' dimension of the arrangement 400', by a difference indicated by ΔZ in FIG. 4. Furthermore, the insert-molded metal element 408 may have a higher stiffness compared to a stiffness of the floor of the lens carrier 412.

Figure 5:
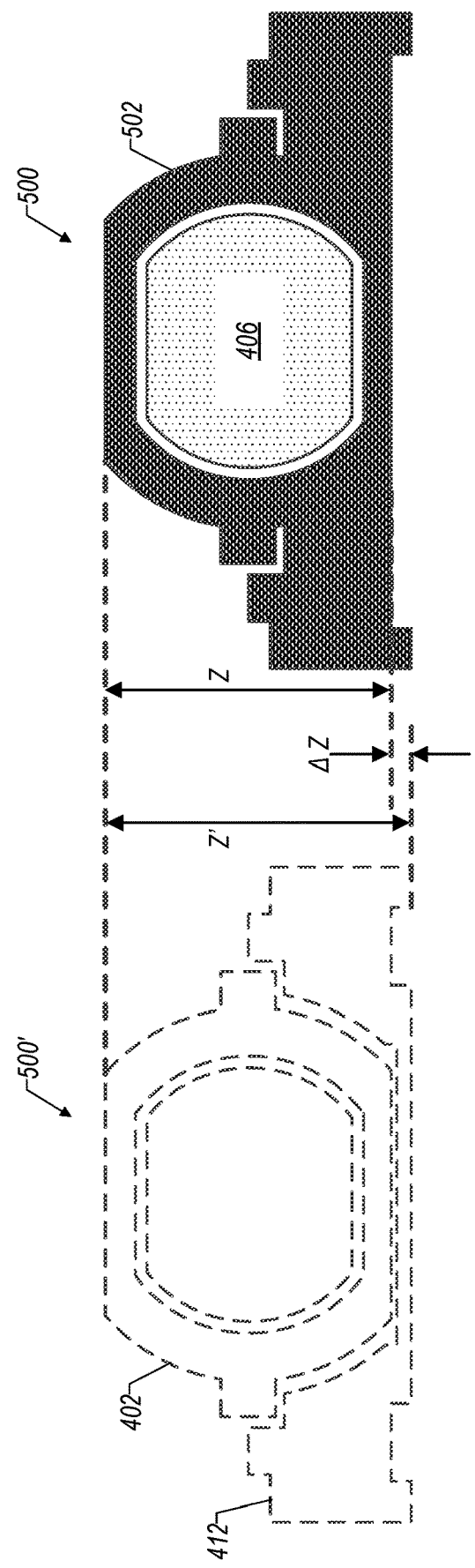
FIG. 5 illustrates an example of another lens barrel arrangement that may enable a size reduction (e.g., in the Z-axis direction) of a lens module that may be included in a folded optics camera, in accordance with some embodiments.

FIG. 5 illustrates an example of another lens barrel arrangement 500 that may enable a size reduction (e.g., in the Z-axis direction) of a lens module that may be included in a folded optics camera (e.g., folded optics system 100 and/or folded optics camera 200 in FIGS. 1-2B). In various embodiments, the lens barrel arrangement 500 may include a lens barrel-carrier hybrid 502 within which the lens group 406 is at least partially contained. In various embodiments, the lens barrel-carrier hybrid 502 may be formed as a single injection molded plastic component, which may be formed with a smaller dimension in the Z-axis direction than some other arrangements. For example, arrangement 500' includes the lens barrel 402 and the lens carrier 412 previously discussed with reference to FIG. 4. The lens barrel arrangement 500 may have a Z dimension (in the Z-axis direction) that is a distance from a bottom surface of the lens barrel-carrier hybrid 502 to a top surface of the lens barrel-carrier hybrid 502, as indicated in FIG. 5. By contrast, the arrangement 500' may have a Z' dimension (in the Z-axis direction) that is a distance from a bottom surface of the lens carrier 412 to a top surface of the lens barrel 402. The Z dimension of the lens barrel arrangement 500 may be smaller than the Z' dimension of the arrangement 500', by a difference indicated by ΔZ in FIG. 5.

Figure 6:
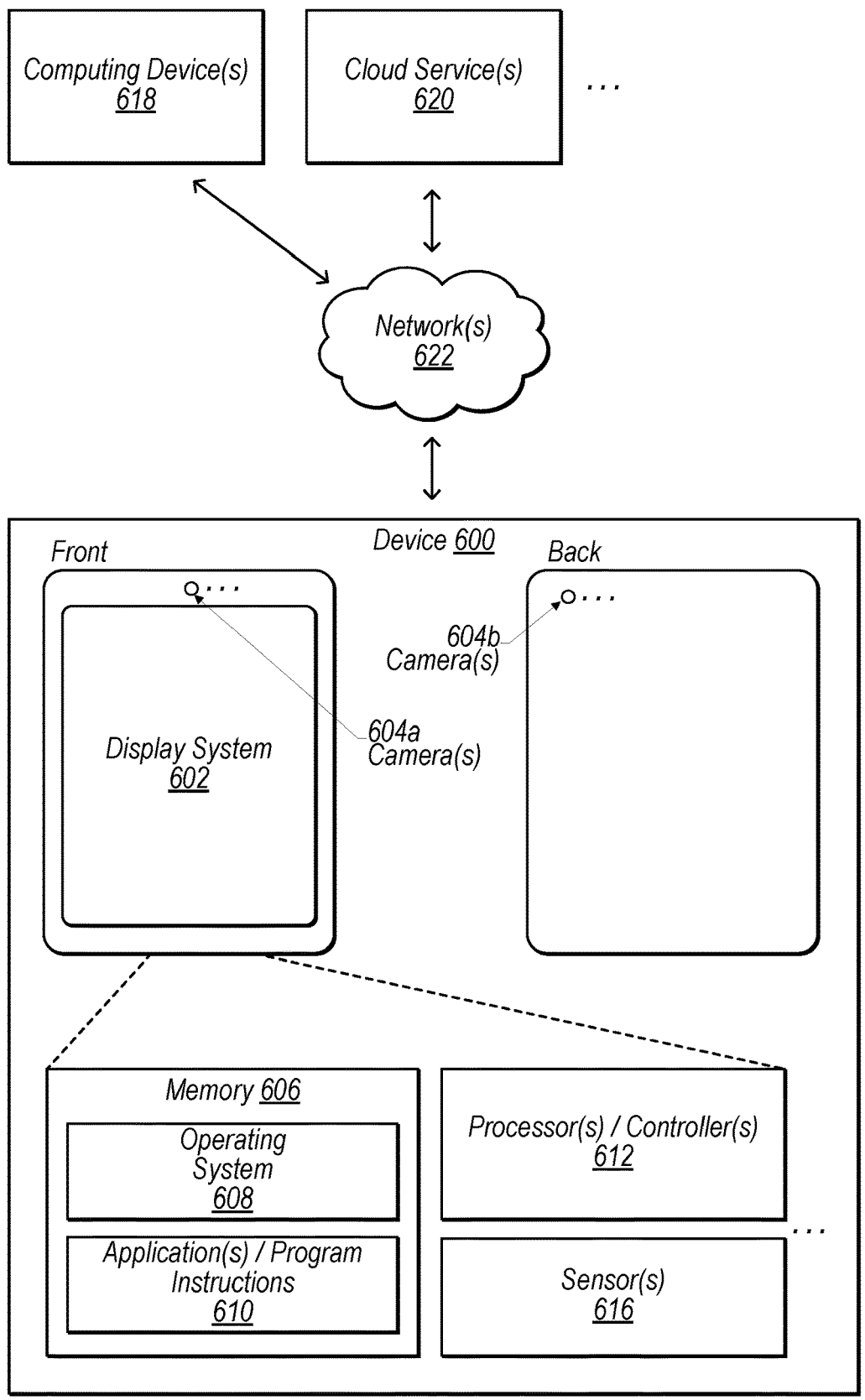
FIG. 6 illustrates a schematic representation of an example device that may include a folded optics camera having one or more actuators and/or one or more suspension arrangements, in accordance with some embodiments.

FIG. 6 illustrates a schematic representation of an example device 600 that may include a folded optics camera (e.g., folded optics system 100 and/or folded optics camera 200 in FIGS. 1-2B, etc.) having one or more actuators and/or one or more suspension arrangements, in accordance with some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 610) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
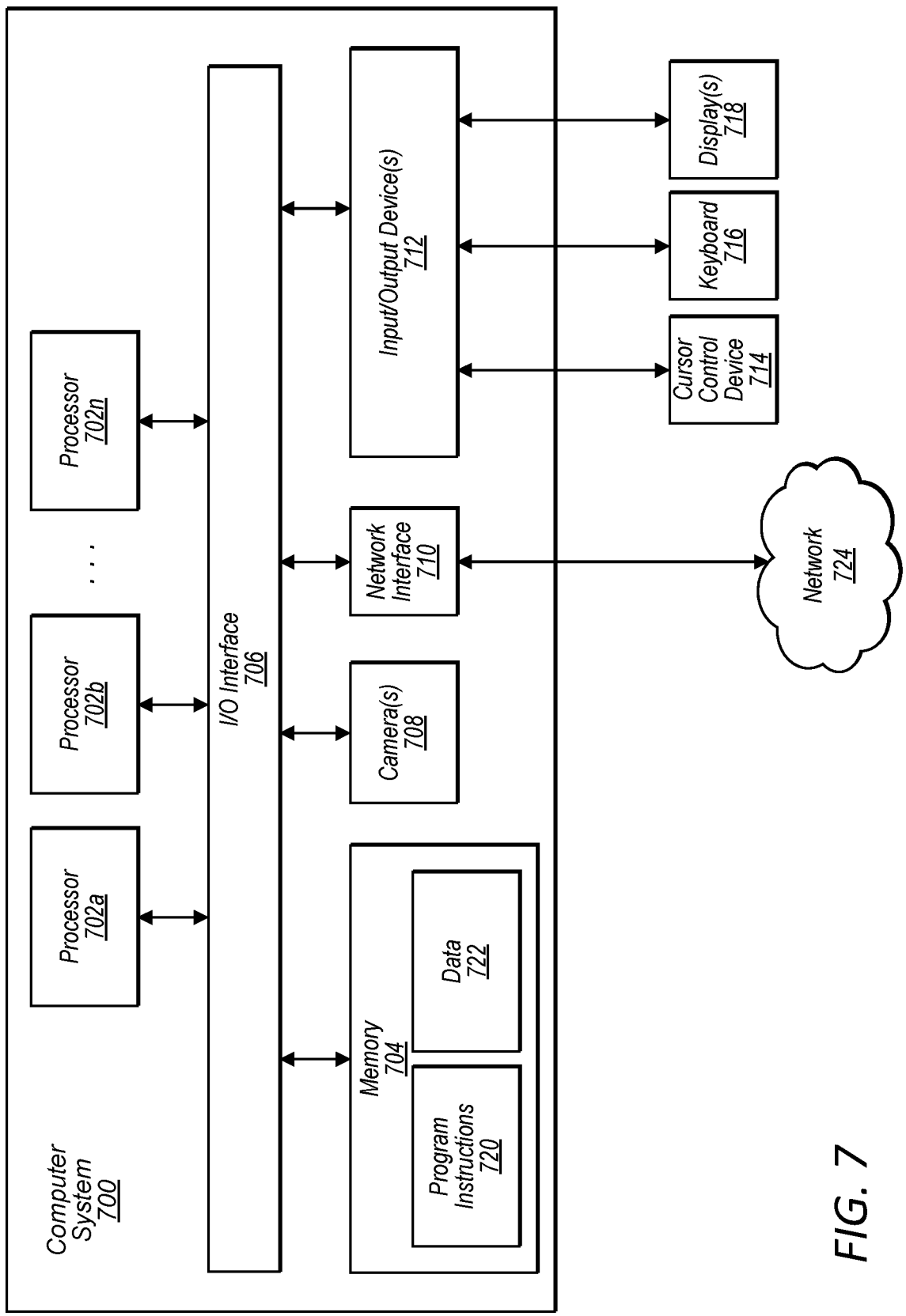
FIG. 7 illustrates a schematic block diagram of an example computer system that may include a folded optics camera having one or more actuators and/or one or more suspension arrangements, in accordance with some embodiments.

FIG. 7 illustrates a schematic block diagram of an example computing device, referred to as computer system 700, that may include or host embodiments of a folded optics camera (e.g., folded optics system 100 and/or folded optics camera 200 in FIGS. 1-2B, etc.) having one or more actuators and/or one or more suspension arrangements, e.g., as described herein with reference to FIGS. 1-6. In addition, computer system 700 may implement methods for controlling operations of the camera and/or for performing image processing images captured with the camera. In some embodiments, the device 700 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a folded optics arrangement, comprising:
   a light folding element to fold a path of light; and
   a lens group comprising one or more lens elements that define an optical axis;
an image sensor to capture light that has passed through at least the light folding element and the lens group;
a lens barrel arrangement fixedly coupled with the lens group;
an actuator arrangement, comprising:
   one or more actuators to move the light folding element relative to the image sensor; and
   one or more voice coil motor (VCM) actuators, comprising:
      a plurality of magnets fixedly coupled with the lens barrel arrangement; and
      a plurality of coils fixedly coupled with a base structure of the camera, wherein the base structure is stationary relative to motion of the lens group;
      wherein the one or more VCM actuators are configured to:
         move the lens group in at least a first direction that is parallel to the optical axis;
         move the lens group in at least a second direction that is orthogonal to the optical axis; and
         tilt the lens group about an axis parallel to a third direction that is orthogonal to the first direction and the second direction.

2. The camera of claim 1, wherein respective coils of the plurality of coils are positioned, in the third direction that is orthogonal to the first direction and the second direction, between respective magnets of the plurality of magnets and the base structure.

3. The camera of claim 2, wherein:
light is introduced into the camera via a top of the camera; and
the plurality of magnets extends, in the third direction, below a center of mass of the lens group and is positioned proximate a bottom of the camera.

4. The camera of claim 1, further comprising:
a suspension arrangement that suspends the lens barrel arrangement from the base structure and that allows motion of the lens group enabled by the one or more VCM actuators, wherein the suspension arrangement comprises:
   one or more springs attached to the lens barrel arrangement; and
   a plurality of suspension wires attached to the one or more springs and to the base structure.

5. The camera of claim 4, wherein:
the one or more springs comprise a plurality of sheet springs attached to corner portions of the lens barrel arrangement;
respective suspension wires of the plurality of suspension wires are attached to respective sheet springs of the plurality of sheet springs;
the plurality of sheet springs defines a plane that is parallel to the optical axis; and
the respective suspension wires define respective axes that are orthogonal to the plane and orthogonal to the optical axis.

6. The camera of claim 1, wherein the one or more VCM actuators are configured to move the lens group in multiple directions along a plane that is orthogonal to an image plane of the image sensor.

7. The camera of claim 1, further comprising:
a flex circuit fixedly coupled with the plurality of coils;
wherein the camera is configured to convey electrical current to the plurality of coils via the flex circuit.

8. The camera of claim 1, wherein the one or more actuators to move the light folding element comprise:
an actuator to tilt, about a tilt axis that is orthogonal to the optical axis and parallel to the second direction, the light folding element relative to the image sensor.

9. A device, comprising:
one or more processors;
memory storing program instructions executable by the one or more processors to control operations of a camera; and
the camera, comprising:
   a folded optics arrangement, comprising:
      a light folding element to fold a path of light; and
      a lens group comprising one or more lens elements that define an optical axis;
      an image sensor to capture light that has passed through at least the light folding element and the lens group;
   a lens barrel arrangement fixedly coupled with the lens group;
   one or more voice coil motor (VCM) actuators to move the lens group in at least a first direction parallel to the optical axis and a second direction orthogonal to the optical axis, and wherein the one or more VCM actuators are configured to tilt the lens group about an axis parallel to a third direction that is orthogonal to the first direction and the second direction, the one or more VCM actuators comprising:
      a plurality of magnets fixedly coupled with the lens barrel arrangement; and
      a plurality of coils fixedly coupled with a base structure of the camera, wherein the base structure is stationary relative to motion of the lens group;
      wherein respective coils of the plurality of coils are positioned, in the third direction, between respective magnets of the plurality of magnets and the base structure.

10. The device of claim 9, wherein:
light is introduced into the camera via a top of the camera; and
the plurality of magnets extends, in the third direction, below a center of mass of the lens group and is positioned proximate a bottom of the camera.

11. The device of claim 9, further comprising one or more actuators to move the light folding element relative to the image sensor.

12. The device of claim 9, wherein:
the plurality of magnets comprises:
   a first set of magnets positioned, in the second direction orthogonal to the optical axis, between the lens group and a first side of the camera; and
   a second set of magnets positioned, in the second direction, between the lens group and a second side of the camera that is opposite the first side relative to the lens group;
the plurality of coils comprises:
   a first set of coils positioned, in the second direction, between the lens group and the first side of the camera; and
   a second set of coils positioned, in the second direction, between the lens group and the second side of the camera.

13. The device of claim 12, wherein:
each of the first set of magnets and the second set of magnets comprises:
  a respective first autofocus (AF) magnet;
  a respective second AF magnet; and
  a respective optical image stabilization (OIS) magnet positioned, in the first direction parallel to the optical axis, between the respective first AF magnet and the respective second AF magnet; and
each of the first set of coils and the second set of coils comprises:
  a respective first AF coil;
  a respective second AF coil; and
  a respective OIS coil positioned, in the first direction parallel to the optical axis, between the respective first coil and the respective second AF coil.

14. The device of claim 13, wherein:
the respective first AF magnet and the respective first AF coil are capable of electromagnetically interacting with one another to produce Lorentz forces that move the lens group so as to provide AF motion of an image on the image sensor;
the respective second AF magnet and the respective second AF coil are capable of electromagnetically interacting with one another to produce Lorentz forces that move the lens group so as to provide AF motion of the image on the image sensor; and
the respective OIS magnet and the respective OIS coil are capable of electromagnetically interacting with one another to produce Lorentz forces that move the lens group so as to provide OIS motion of the image on the image sensor.

15. The device of claim 14, wherein the one or more processors are configured to:
control the one or more VCM actuators to produce, using an AF magnet-coil portion, Lorentz forces that provide the AF motion, wherein the AF magnet-coil portion comprises:
  the respective first AF magnet and the respective second AF magnet of each of the first set of magnets and the second set of magnets; and
  the respective first AF coil and the respective second AF coil of each of the first set of coils and the second set of coils.

16. The device of claim 15, wherein the one or more processors are configured to:
control the one or more VCM actuators to produce, using the AF magnet-coil portion, Lorentz forces that tilt the lens group about the axis parallel to the third direction so as to compensate for forces that would cause the lens group to stray from a predetermined optical alignment, wherein, to control the one or more VCM actuators to produce the Lorentz forces that compensate for the forces that would cause the lens group to stray from the predetermined optical alignment, the one or more processors are configured to:
  control electrical current supplied to the respective first AF coil and the respective second AF coil of the first set of coils independently of electrical current supplied to the respective first AF coil and the respective second AF coil of the second set of coils, such that Lorentz forces produced by the AF portion of the first set of coils and the first set of magnets are in an opposite direction from Lorentz forces produced by the AF portion of the second set of coils and the second set of magnets.

17. The device of claim 14, wherein the one or more processors are configured to:
control the one or more VCM actuators to produce, using an OIS magnet-coil portion, Lorentz forces that provide the OIS motion, wherein the OIS magnet-coil portion comprises:
  the respective OIS magnet of each of the first set of magnets and the second set of magnets; and
  the respective OIS coil of each of the first set of coils and the second set of coils.

18. The device of claim 14, wherein:
the respective first AF magnet and the respective second AF magnet have a respective longest dimension in the second direction orthogonal to the optical axis;
the respective OIS magnet has as respective longest dimension in the first direction parallel to the optical axis;
the respective first AF coil and the respective second AF coil have a respective longest dimension in the second direction; and
the respective OIS magnet has a respective longest dimension in the first direction.

19. A folded optics system, comprising:
a lens group including one or more lens elements;
a light folding element to redirect light to the lens group, wherein the light is to pass through the light folding element and the lens group before reaching an image sensor;
a lens barrel arrangement fixedly coupled with the lens group;
an actuator arrangement, comprising:
  one or more actuators to move the light folding element relative to the image sensor; and
  one or more voice coil motor (VCM) actuators, comprising:
    a plurality of magnets fixedly coupled with the lens barrel arrangement; and
    a plurality of coils fixedly coupled with a base structure of the camera, wherein the base structure is stationary relative to motion of the lens group;
  wherein the one or more VCM actuators are configured to:
    move the lens group in at least a first direction that is parallel to the optical axis;
    move the lens group in at least a second direction that is orthogonal to the optical axis; and
    tilt the lens group about an axis parallel to a third direction that is orthogonal to the first direction and the second direction.

20. The folded optics system of claim 19, wherein:
the lens barrel arrangement comprises:
  a lens barrel within which the lens group is at least partially contained; and
  a lens carrier fixedly coupled with the lens barrel, wherein the lens carrier comprises an insert molded metal element that forms a floor of the lens carrier and that is positioned proximate a bottom surface of the lens barrel; or
the lens barrel arrangement comprises:
  a lens barrel-carrier hybrid within which the lens group is at least partially contained, wherein the lens barrel-carrier hybrid is formed as a single injection molded plastic component.

* * * * *